(12) United States Patent
Bulea

(10) Patent No.: US 11,790,544 B1
(45) Date of Patent: Oct. 17, 2023

(54) DEPTH MOTION DETERMINATION VIA TIME-OF-FLIGHT CAMERA

(71) Applicant: Synaptics Incorporated, San Jose, CA (US)

(72) Inventor: Mihai M. Bulea, Santa Clara, CA (US)

(73) Assignee: Synaptics Incorporated, San Jose, CA (US)

(*) Notice: Subject to any disclaimer, the term of this patent is extended or adjusted under 35 U.S.C. 154(b) by 948 days.

(21) Appl. No.: 16/519,173

(22) Filed: Jul. 23, 2019

Related U.S. Application Data

(60) Provisional application No. 62/714,900, filed on Aug. 6, 2018.

(51) Int. Cl.
- *G06T 7/521* (2017.01)
- *G01S 17/10* (2020.01)
- *G01S 17/50* (2006.01)
- *G01S 17/32* (2020.01)

(52) U.S. Cl.
CPC ............... *G06T 7/521* (2017.01); *G01S 17/10* (2013.01); *G01S 17/32* (2013.01); *G01S 17/50* (2013.01)

(58) Field of Classification Search
CPC .......... G06T 7/521; G01S 17/10; G01S 17/32; G01S 17/50
See application file for complete search history.

(56) References Cited

U.S. PATENT DOCUMENTS

| | | | |
|---|---|---|---|
| 3,611,377 A * | 10/1971 | Rittenbach | G01S 13/62 342/127 |
| 2016/0232684 A1* | 8/2016 | Kholodenko et al. | H04N 13/204 |
| 2017/0212228 A1* | 7/2017 | Van Nieuwenhove | G01S 7/4915 |
| 2019/0147624 A1* | 5/2019 | Plank et al. | G06T 7/246 382/106 |

FOREIGN PATENT DOCUMENTS

| WO | 2004070313 A1 * | 8/2004 | G01S 7/4863 |
|---|---|---|---|

* cited by examiner

*Primary Examiner* — Luke D Ratcliffe
(74) *Attorney, Agent, or Firm* — Paradice & Li LLP

(57) ABSTRACT

A time-of-flight camera includes a light emitter, a photo detector, and a controller. The time-of-flight camera may determine depth motion of an object by emitting light pulses, receiving reflected light pulses from the object, and accumulating a plurality of charges based on the reflected light pulses. The depth motion may be determined by the controller through analysis of the accumulated charges.

18 Claims, 7 Drawing Sheets

DEPTH MOTION DETERMINATION VIA TIME-OF-FLIGHT CAMERA

CROSS-REFERENCE TO RELATED APPLICATION

This application claims the benefit of co-pending and commonly owned U.S. Provisional Pat. Application No. 62/714,900 entitled "DEPTH MOTION DETERMINATION VIA TIME-OF-FLIGHT CAMERA" filed on Aug. 6, 2018, the entirety of which is hereby incorporated by reference.

TECHNICAL FIELD

The present embodiments relate generally to image sensors, and specifically to depth motion determination via time-of-flight cameras.

BACKGROUND OF RELATED ART

Image sensors are often used to collect information and generate still and/or moving images. Image sensors can be found in devices such as digital cameras, video recorders, cell phones, and the like.

Lateral motion and depth motion may be detected by the image sensors. Lateral motion of an object may be motion in a plane parallel to the image sensor. Depth motion of an object may be motion in a plane that is perpendicular to the image sensor. Lateral motion may be detected using 2D imaging algorithms, such as optical flow algorithms. Some image sensors, such as 3D cameras, may provide depth information (the distance associated with each pixel) in addition to 2D image information. For these 3D cameras, conventional methods of detecting depth motion (motion toward or away from the image sensor) based on successive 3D images has been slow and relatively inaccurate.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus is disclosed. The apparatus includes a light emitter configured to emit one or more light pulses, a photodetector configured to detect reflections of the one or more light pulses and generate a reflected light signal based on the detected reflections, a plurality of charge storage elements configured to accumulate charge based on the reflected light signal, and a controller. The controller executes instructions stored in a memory that cause the apparatus to measure a first plurality of accumulated charges associated with the first light pulse, and determine a first phase-shift of the reflected light signal based on the first plurality of accumulated charges, wherein the first phase-shift indicates a depth motion of an object reflecting the first light pulse.

A method is disclosed. The method includes emitting, by a light emitter, one or more light pulses, detecting, by a photodetector, reflections of the one or more light pulses and generating a reflected light signal based on the detected reflections, and accumulating charge, by a plurality of charge storage elements, based on the reflected light signal. The method further includes measuring a first plurality of accumulated charges associated with a first light pulse, and determining a first phase-shift of the reflected light signal based on the first plurality of accumulated charges, wherein the first phase-shift indicates a depth motion of an object reflecting the first light pulse.

An apparatus is disclosed. The apparatus includes a means for emitting one or more light pulses, a means for detecting reflections of the one or more light pulses, and a means for generating a reflected light signal based on the detected reflections. The apparatus also includes a means for accumulating charge, by a plurality of charge storage elements, based on the reflected light signal, a means for measuring a plurality of accumulated charges associated with a first light pulse, and a means determining a phase-shift of the reflected light signal based on the plurality of accumulated charges, wherein the phase-shift indicates a depth motion of an object reflecting the first light pulse.

BRIEF DESCRIPTION OF THE DRAWINGS

The present embodiments are illustrated by way of example and are not intended to be limited by the figures of the accompanying drawings.

DETAILED DESCRIPTION

Figure 1:
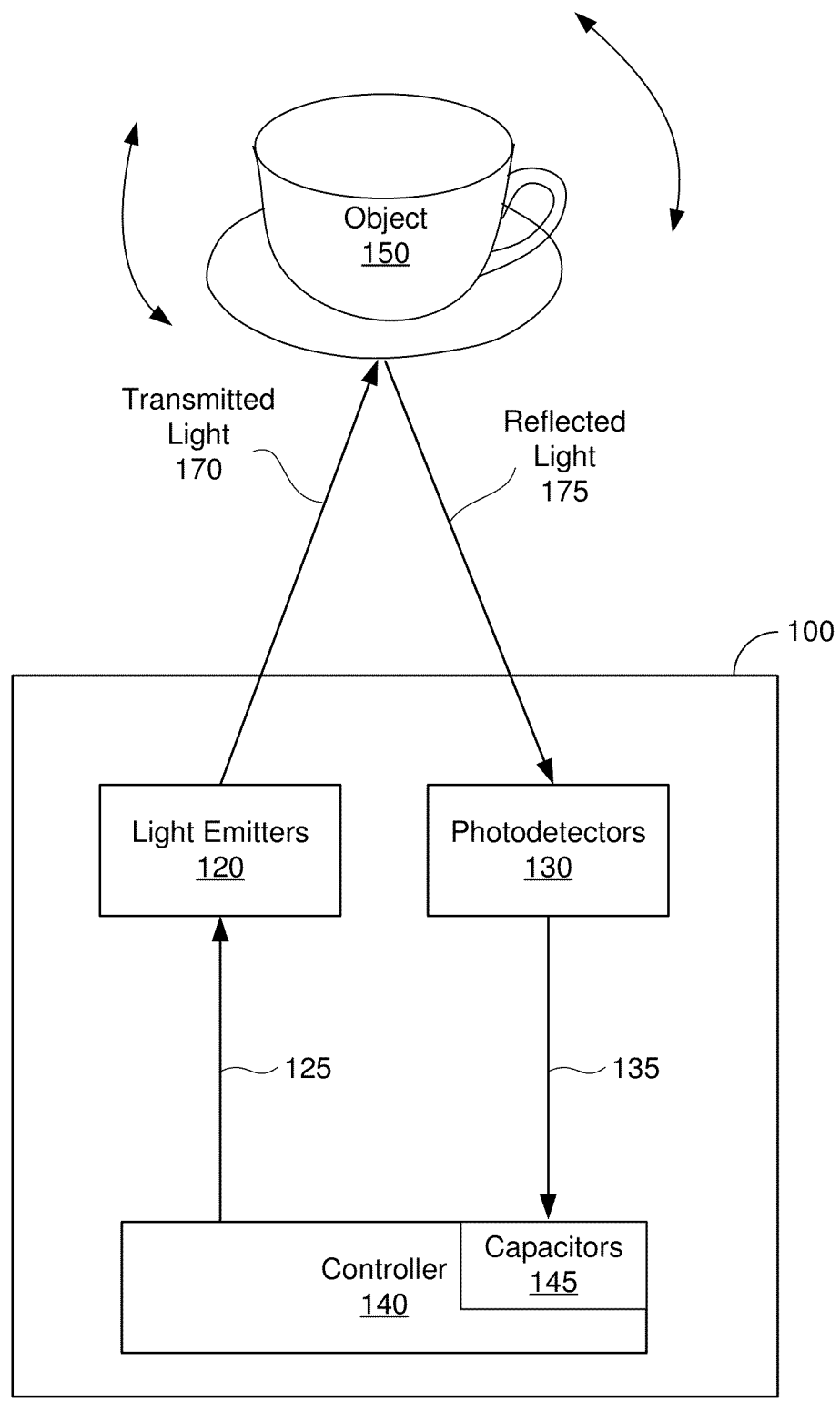
FIG. 1 shows a simplified diagram of an example time-of-flight camera.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

FIG. 1 shows a simplified diagram of an example time-of-flight (TOF) camera 100. The TOF camera 100 may detect points or objects in a sensing area by emitting (transmitting) pulses of light that illuminate the points or objects and detecting reflected light pulses. The TOF camera 100 may determine the distance to an object in the sensing area based on a delay between the time a light pulse is transmitted and the time a corresponding reflected light pulse is received from the object. This delay time, which may also be referred to as a "time-of-flight" or a round-trip time of the light pulse, may be multiplied by the speed of light to determine the distance between the TOF camera 100 and an object. In some example implementations, the TOF camera 100 may also determine motion (depth motion) information associated with objects based on the time-of-flight information.

The TOF camera 100 is shown to include a number of light emitters 120, a number of photodetectors 130, and a controller 140. The light emitters 120 are coupled to the controller 140. The controller 140 may direct the light emitters 120 to transmit or emit light toward an object 150 within the sensing area. In some implementations, the controller 140 may generate an emitter control signal 125 to cause the light emitters 120 to emit one or more light pulses that may be used to detect the object 150. The light emitters 120 may include any number of light sources such as, for example, laser diodes, light emitting diodes (LEDs), vertical cavity surface emitting lasers (VCSEL), or any other suitable device configured to selectively transmit or emit light, including devices to emit light pulses at a source wavelength. The source wavelength may include, for example, ultraviolet, visible, and/or infrared portions of the electromagnetic spectrum.

Transmitted light 170 emitted from the light emitters 120 may be reflected by the object 150 to generate reflected light 175 that may be received by the photodetectors 130. The photodetectors 130 may be configured to convert the reflected light 175 into electrical signals such as a reflected light signal 135, based on an intensity level of the reflected light 175. The photodetectors 130 may be any suitable component or device that can receive or sense light including, for example, photodiodes, avalanche photodiodes, phototransistors, pixel sensors, charge coupled devices (CCD), or the like.

The photodetectors 130 may be coupled to the controller 140. The controller 140 may include analog and/or digital processing circuits for receiving, converting, and processing signals from the photodetectors 130. For example, in some implementations, the controller 140 may include a plurality of capacitors 145 to accumulate charge based on signals from the photodetectors 130. In other implementations the capacitors 145 may be separate from the controller 140, yet still within the TOF camera 100. Other analog and/or digital processing circuits of the controller 140 are not shown for simplicity. The controller 140 may determine distances and motion associated with the object 150 based at least in part on the TOF information associated with the emitter control signal 125 and the reflected light signal 135.

In some implementations, when the object 150 is in motion, an image of the object 150 (e.g., a frame of pixels captured through the photodetectors 130) may be affected by motion artifacts. The motion artifacts may be undesirable and, in some cases, may blur or reduce the quality of the image. However, since the controller 140 can determine motion information, the controller 140 may remove some or all of the motion artifacts from the image of the object 150 using well-known methods. In some aspects, the more detailed the determined motion information, the better the controller 140 can correct the image of the object 150.

Figure 2:
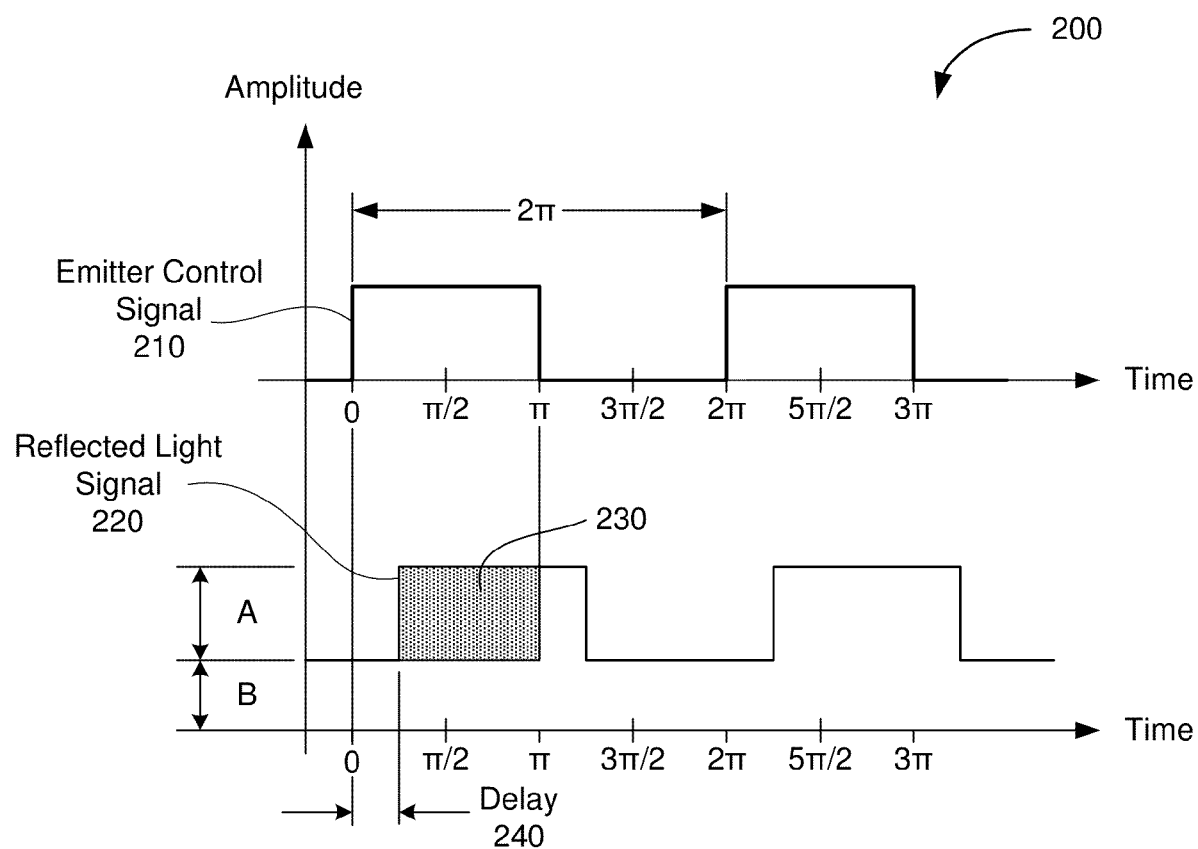
FIG. 2 shows a simplified signal diagram depicting example waveforms associated with light transmitted from, and received by, the time-of-flight camera of FIG. 1 in the presence of motion.

FIG. 2 shows a simplified timing diagram 200 depicting example waveforms associated with light transmitted from, and received by, the TOF camera 100 of FIG. 1 in the presence of depth motion. Depth motion may refer to motion that is perpendicular to (toward or away from) the TOF camera. In contrast, regular or lateral motion may refer to motion that is generally parallel to the TOF camera. In some implementations, a controller, such as the controller 140 of FIG. 1, may control light emitters, such as the light emitters 120 from FIG. 1, to generate one or more transmitted light pulses by an emitter control signal 210. The emitter control signal 210, and therefore the corresponding transmitted light pulses, may be periodic. The example emitter control signal 210 is shown as having a period of $2\pi$, however other periods are possible.

The light pulses corresponding to the emitter control signal 210 may be reflected by an object in the sensing area and received by photodetectors, such as the photodetectors 130 of FIG. 1. The photodetectors may generate a reflected light signal 220. As shown, the reflected light signal 220 may have a period corresponding to the period of the emitter control signal 210. The reflected light signal 220 may have a baseline component B (e.g., an offset from an arbitrary reference) and an amplitude A. The baseline component B may be caused by background light washing over the foreground or object, independent light sources adding light to the scene, or other sources. In addition, the received signal also may include noise.

In some example implementations, the photodetectors and/or the controller may accumulate and measure charge (e.g., an electric charge) associated with the reflected light signal 220. For example, the emitter control signal 210 may be divided into time periods, each $\pi/2$ long. The time periods may be used to determine the accumulated charge values. In one example implementation, an amount of charge 230 may be associated with the reflected light signal 220 between the time period from 0 to $\pi$. Other amounts of charge associated with other time periods are possible and are not shown for simplicity. The charges may be stored (accumulated) in a capacitor or other suitable charge storing element or device (not shown for simplicity) associated with the photodetectors. The reflected light signal 220 may be received at the TOF camera after a delay 240. The delay 240 may correspond to a TOF delay associated with the propagation and reflection of light.

In some example implementations, the timing of the emitter control signal 210, the reflected light signal 220, and/or one or more charges 230 associated with the reflected light signal 220 may be used to determine distance and motion information associated with one or more objects in the sensing area. The motion information may include depth motion information. Example procedures to determine motion associated with one or more objects are discussed in conjunction with FIGS. 3-6 below.

Figure 3:
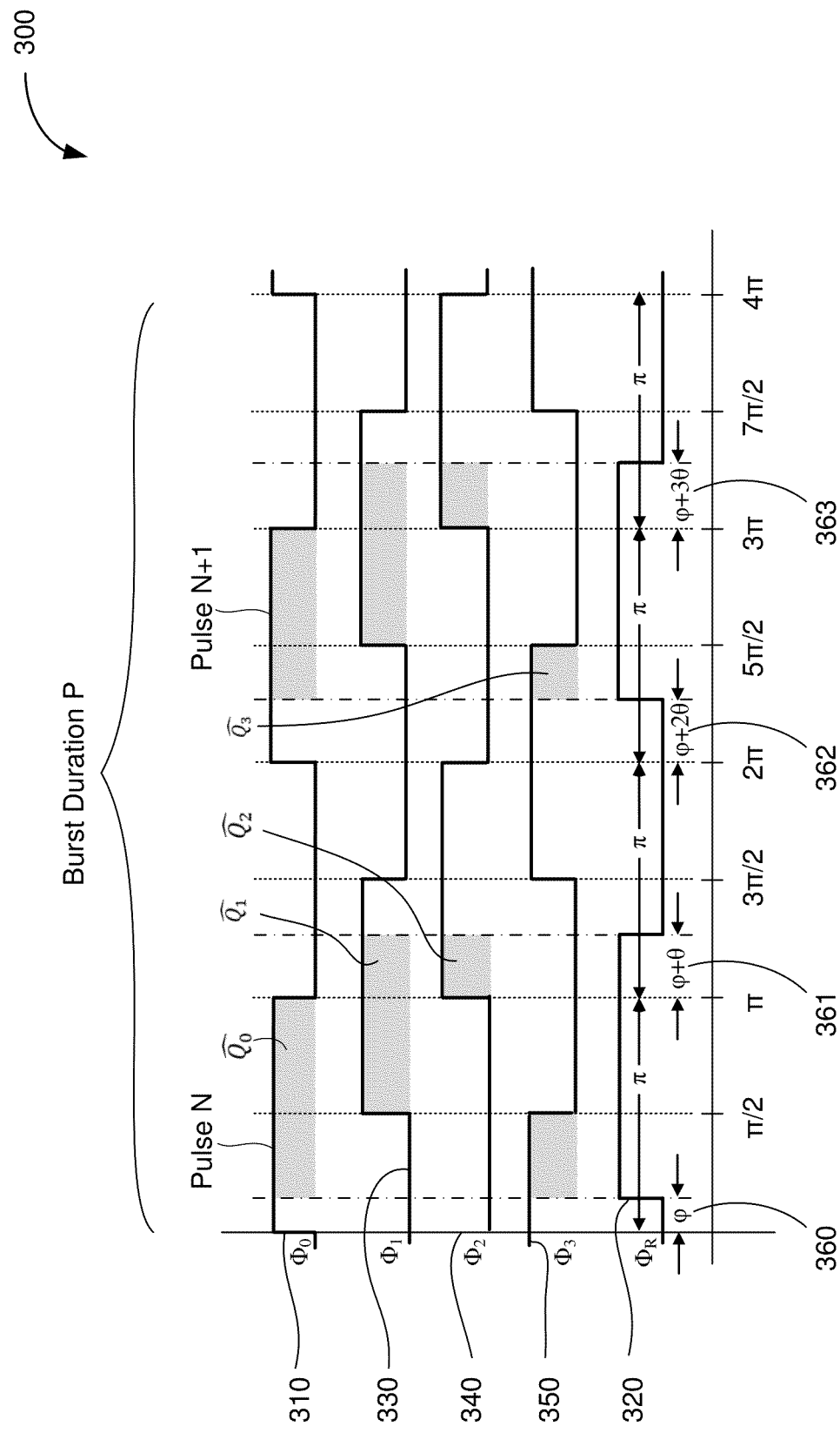
FIG. 3 shows an example diagram of signals and charges that may be associated with the time-of-flight camera of FIG. 1.

FIG. 3 shows an example timing diagram 300 of signals and electric charges that may be associated with the TOF camera 100 of FIG. 1. Waveform 310 may show example timing information associated with the emitter control signal 125 of FIG. 1 during a burst duration P. The burst duration P shown in FIG. 3 may be a duration of $4\pi$. However, other durations are possible. Further, a burst duration P may include any feasible integer number of pulses. The waveform 310 is shown as a periodic signal (period = $2\pi$) and is plotted against equal (and arbitrary) time periods of $\pi/2$ duration. In other implementations, other time periods are possible. For example, longer time periods ($> \pi/2$) or shorter time periods ($< \pi/2$) may be used. The waveform 310 may show timing information corresponding to a periodic transmission of light pulses.

Waveform 320 may show example timing and amplitude information associated with the reflected light signal 135 of FIG. 1. In some implementations, the baseline component B may be removed from the reflected light signal 135 (and the waveform 320). Persons having skill in the art will appreciate that there are a variety of processing procedures available to remove the baseline component B from the reflected light signal 135. For example, signals may be received from the photodetectors 130 of FIG. 1 when the light emitters 120 are not transmitting light. Such signals may be considered to be the baseline component B that may be subtracted from subsequent signals received from the photodetectors 130 in response to light being transmitted from the light emitters 120.

As shown, the waveform 320 may be delayed by a time period 360 with respect to the waveform 310. In some example implementations, the time period 360 may be referred to as a phase $\varphi$, or a phase delay. The phase $\varphi$ may refer to the difference between the phase of a transmit signal (e.g., the waveform 310) and the phase of a received signal (e.g., the waveform 320). The time period 360 may be associated with a TOF delay due to the distance between the TOF camera and an object, and the velocity of light. If the object is in motion, then the TOF delay may not be constant for a set of successive periods of the reflected light signal 135 shown in the waveform 320. In the timing diagram 300, the TOF delay is shown to increase by a time, referred to as a phase-shift $\theta$, for each time period $\pi$. Thus, time period 361 is $\varphi+\theta$, time period 362 is $\varphi+2\theta$, and time period 363 is $\varphi+3\theta$ in duration. In some implementations, the value of the phase-shift $\theta$ may also indicate relative motion with respect to the TOF camera. For example, if the phase-shift $\theta$ is positive, then the object reflecting light may be moving away from the TOF camera. In another example, if the phase-shift $\theta$ negative, then the object reflecting light may be moving toward the TOF camera. In some other implementations, the relationship between the sign of the phase-shift $\theta$ and the direction of motion of the object may be reversed. (In this example, motion is assumed to have a constant speed, which may be true for small time periods $\theta$ with respect to the time period $2\pi$. In other words, the speed of the motion may be assumed to be constant when the duration of the light pulses is relatively small with respect to the speed of the motion. The duration of the light pulses may be a few milliseconds. Thus, the speed of the motion may be constant or relatively constant within the time of the duration of the light pulses.) In other implementations, the TOF delay may decrease in subsequent time periods. The distance between the object and the TOF camera may be associated with the phase ($\varphi$ and motion associated with the object may be associated with the phase-shift $\theta$.

Electric charge (sometimes referred to as "charge", for simplicity) may be accumulated (stored) based on the waveform 320 (e.g., the reflected light signal 135) and time periods referenced to the waveform 310 (e.g., the emitter control signal 125). A different charge amount may be accumulated for different time periods. In some example implementations, the number of accumulated charges may be related to time periods associated with the waveform 320.

The waveform 310 shows a first accumulated charge $\hat{Q}_0$ that may be associated with a time period 0 to $\pi$. Waveform 330 shows a second accumulated charge $\hat{Q}_1$ that may be associated with a time period $\pi/2$ to $3\pi/2$. Waveform 340 shows a third accumulated charge $\hat{Q}_2$ that may be associated with a time period $\pi$ to $2\pi$. Finally, signal 350 shows a fourth accumulated charge $\hat{Q}_3$ that may be associated with a time period $3\pi/2$ to $5\pi/2$. Note that accumulated charges $\hat{Q}_0, \hat{Q}_1, \hat{Q}_2, \hat{Q}_3$ are also associated with the waveform 320 (e.g., the reflected pulses 220 without the baseline component B).

In other words, the waveform 310, which is associated with transmitted light pulses, and the waveform 320, which is associated with the reflected light pulses minus the offset B, may control directly or indirectly, accumulation of charge $\hat{Q}_0$. The waveforms 330, 340, and 350 may be time-shifted versions of the waveform 310. The waveform 330 is shifted by $\pi/2$ with respect to the waveform 310 may control the accumulation of charge $\hat{Q}_1$. The waveform 340 is shifted by $\pi$ with respect to the waveform 310 and may control accumulation of charge $\hat{Q}_2$. The waveform 350 is shifted by $3\pi/2$ with respect to the waveform 310 and may control accumulation of charge $\hat{Q}_3$. In some example implementations, accumulation of charge may occur when a first signal (e.g., waveform 310, 330, 340, or 350) is a logical "1" and a second signal (e.g., waveform 320) is also a logical 1 during a time period referenced to the first signal. The time periods associated with each first signal may be as discussed above. That is, the time period for waveform 310 is 0 to π, the time period for the waveform 330 is π/2 to 3π/2, the time period for the waveform 340 is π to 2π, and the time period for the waveform 350 is 3π/2 to 5π/2.

The accumulated charges $\hat{Q}_0, \hat{Q}_1, \hat{Q}_2, \hat{Q}_3$ may be expressed by the set of equations below:

$$\begin{cases} \hat{Q}_0 = A(\pi - \varphi - (N-1)\theta) \\ \hat{Q}_1 = A(\pi/2 + \varphi + N\theta) \\ \hat{Q}_2 = A(\varphi + N\theta) \\ \hat{Q}_3 = A(\pi/2 - \varphi - (N-1)\theta) \end{cases} \quad [\text{eq. 1}]$$

where A is the amplitude of the waveform 320;
N is a total number of excitation pulses within a burst duration
φ is the phase associated with the waveform 320; and
θ is the phase-shift associated with the waveform 320.

The total number of excitation pulses may refer to a number of excitation pulses within a burst duration. The example of FIG. 3 shows a burst duration P having a first excitation pulse N and a second excitation pulse N+1. Note that in this example, the second excitation pulse N+1 is successive and/or adjacent to the first excitation pulse N. Although only two excitation pulses are shown here, any number of excitation pulses are possible. As noted above, the accumulated charges $\hat{Q}_0, \hat{Q}_1, \hat{Q}_2, \hat{Q}_3$ of equation 1 may be associated with a reflected light signal minus a baseline component.

After a burst of N excitation pulses, the accumulated charges may be measured, digitized, and used to determine the phase φ (distance) and/or the phase-shift θ (depth motion) thereby providing distance and motion information, respectively, of a detected object. In some implementations, an analog-to-digital converter (ADC) may be used to measure the accumulated charges. In other implementations, other methods may be used. For example, a timer may be controlled by the emitter control signal and the reflected light signal to determine an accumulated charge based on the timer values. Persons skilled in the art will recognize that other feasible techniques are possible. One example solution for determining the phase φ and the phase-shift θ based on accumulated charges of equation 1 is expressed in the equations below:

$$\varphi = \frac{\pi}{2} \frac{N\hat{Q}_0 - (3N-2)\hat{Q}_2 + N\hat{Q}_1 - 3N\hat{Q}_3}{(\hat{Q}_0 - \hat{Q}_2) + (\hat{Q}_1 - \hat{Q}_3)} \quad [\text{eq. 2}]$$

$$\theta = -\frac{\pi}{2} \frac{(\hat{Q}_0 - 3\hat{Q}_2) + (\hat{Q}_1 - 3\hat{Q}_3)}{(\hat{Q}_0 - \hat{Q}_2) + (\hat{Q}_1 + \hat{Q}_3)} \quad [\text{eq. 3}]$$

Note that the system of equations in equation 1 includes four equations in three unknowns. Thus, solution shown in equations 2, and 3 may be one of many possible solutions.

In some example implementations, the solution for the linear system of equations shown in equation 1 may be found using a least mean square (LMS) approach. For example, the system of equations expressed in equation 1 may be rearranged based on the equation below:

$$A = \frac{1}{\pi}\left[(\hat{Q}_0 - \hat{Q}_2) + (\hat{Q}_1 - \hat{Q}_3)\right] \quad [\text{eq. 4}]$$

Substituting equation 4 into equation 1 and then solving to minimize a mean square error yields a solution for phase-shift θ expressed by the equation below:

$$\theta = -\frac{\pi}{2} \frac{(\hat{Q}_0 - 3\hat{Q}_2) + (\hat{Q}_1 - 3\hat{Q}_3)}{(\hat{Q}_0 - \hat{Q}_2) + (\hat{Q}_1 + \hat{Q}_3)} \quad [\text{eq. 5}]$$

Thus, a least mean square approach may yield a similar solution for the phase-shift θ (shown in equation 5) as shown earlier in equation 3. In some example implementations, the phase-shift θ may be proportional to the depth motion of the object during the burst duration. As described above, motion of the selected object (e.g., speed of the object) is assumed to be constant. In some example implementations, if the motion of the object is not constant, then the phase-shift θ may represent an average phase-shift. Notably, the phase-shift θ may be determined with a single light pulse. In other words, both a distance φ and a depth motion θ may be determined with each pulse of light. Thus, the solution expressed in equation 5 may determine depth motion more quickly than other methods which may rely on multiple pulses to provide multiple distance measurements with which to determine depth motion.

The solutions for the phase-shift θ described in equations 3 and 5 are based on a removal of the offset B from the reflected light signal 135. In some other example implementations, the offset B may be removed from solution computations by generating the light pulses with an asymmetric form factor (or a duty cycle that is other than 50%). One example of using non-symmetric form factor light pulses is described below in conjunction with FIG. 4.

Figure 4:
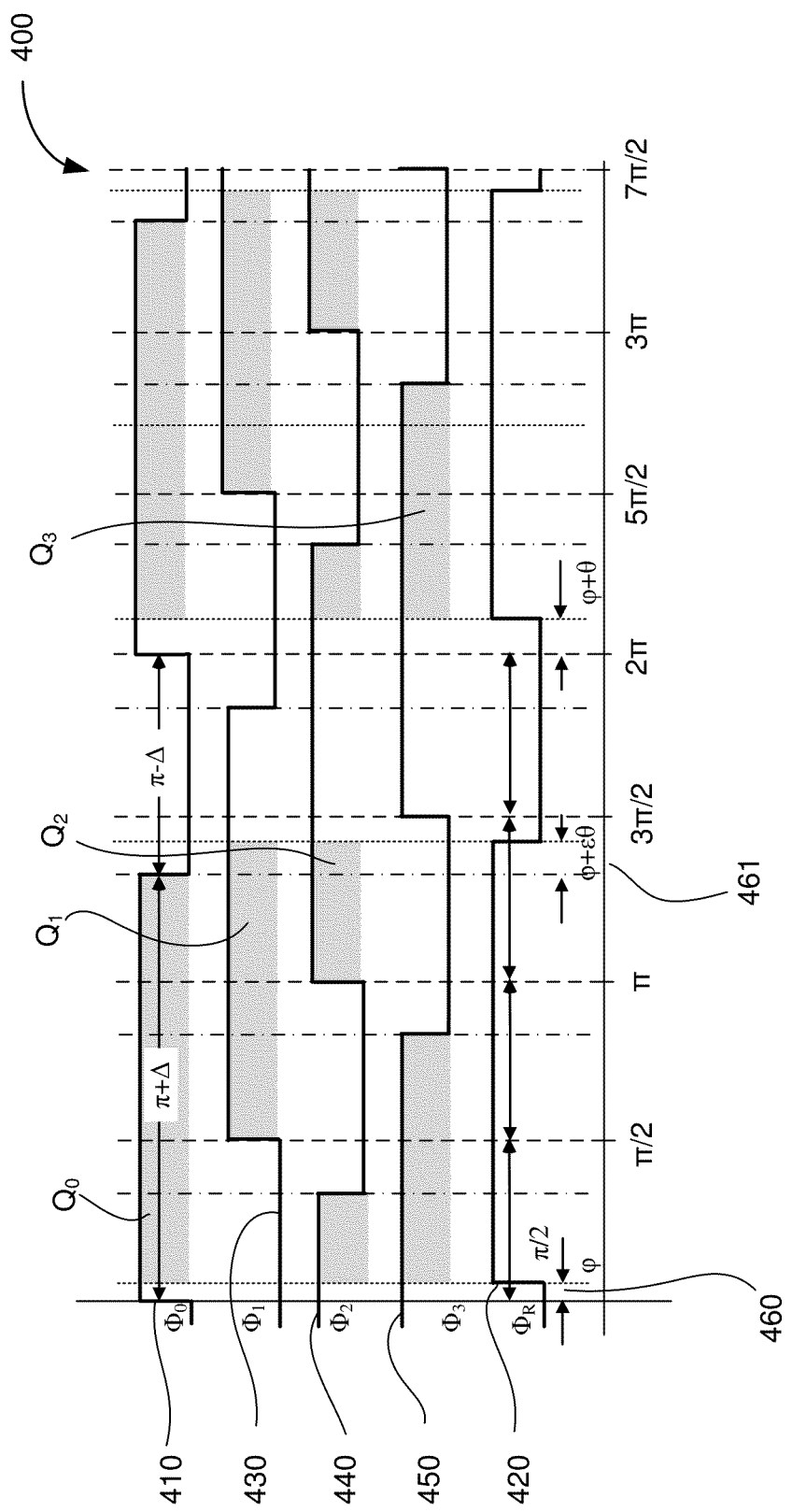
FIG. 4 shows another example diagram of signals and charges that may be associated with the time-of-flight camera of FIG. 1.

FIG. 4 shows another example timing diagram 400 of signals and charges that may be associated with the TOF camera 100 of FIG. 1. Waveform 410 may show example timing information associated with the emitter control signal 125 of FIG. 1. Although the waveform 410 is shown as a periodic signal with a period of 2π, the form factor of waveform 410 is non-symmetric. The non-symmetric form factor of the waveform 410 may be different from the symmetric form factor of the waveform 310 of FIG. 3. As shown, the waveform 410 is high (e.g., the light emitters 120 of FIG. 1 are emitting light) between the times 0 to π+Δ where Δ is a constant. Similarly, the waveform 410 is low (e.g., the light emitters 120 are not emitting light) between the times π+Δ and 2π. The waveform 410 is shown plotted against equal time periods of π/2 duration. Waveform 420 may show example timing and amplitude information associated with the reflected light signal 135. Although not shown for simplicity, the waveform 420 may include a baseline component B in addition to a signal amplitude A, for example, as described with respect to FIG. 2.

As shown, the waveform 420 is delayed by a time 460 (phase φ) with respect to the waveform 410. The time 460 may correspond to a TOF delay due to the distance between the TOF camera 100 and an object, and the velocity of light. If the object is in motion, then the TOF delay may not be constant. In the timing diagram 400, the TOF delay is shown to increase by εθ for each time period π+Δ (for example, see time 461). In other example, the TOF delay may decrease in successive time periods as the TOF delay is associated with the direction of the object with respect to the TOF camera 100. Similar to the timing diagram 300 of FIG. 3, the distance between the object and the TOF camera 100 may be represented by a phase φ and motion associated with the object may be represented by a phase-shift θ.

Charge may be accumulated (stored) based on the waveform 420 (e.g., the reflected light signal 135) during time periods referenced to the waveform 410 (e.g., the emitter control signal 125). A different charge amount may be accumulated for different time periods. In some example implementations, the number of charges accumulated may be related to a number of time periods associated with waveform 410.

The waveform 410 shows a first accumulated charge $Q_0$ that may be associated with a time period 0 to $(\pi+\Delta)$. Waveform 430 shows a second accumulated charge $Q_1$ that may be associated with a time period $\pi/2$ to $(2\pi-\Delta)$. Waveform 440 shows a third charge $Q_2$ that may be associated with a time period $(\pi+\Delta)$ to $2\pi$. Finally, waveform 450 shows a fourth charge $Q_3$ that may be associated with a time period $3\pi/2$ to $(3\pi-\Delta)$. Note that the ε is constant related to a pulse wave form factor (sometimes referred to as duty cycle) of the waveform 410 and is expressed by the equation below:

$$\varepsilon = \frac{\pi+\Delta}{2\pi} = const \qquad \text{[eq. 6]}$$

The accumulated charges $Q_0$-$Q_3$ may be expressed by the set of equations below:

$$\begin{cases} Q_0 = \frac{1}{N}\sum_{i=0}^{N-1}\left[B + A\left((\pi+\Delta)-\varphi-i\theta\right)\right] \\ Q_1 = \frac{1}{N}\sum_{i=0}^{N-1}\left[B + A\left((\pi+\Delta)-\frac{\pi}{2}+\varphi+(i+\varepsilon)\theta\right)\right] \\ Q_2 = \frac{1}{N}\sum_{i=0}^{N-1}\left[B + A(2\Delta+\varepsilon\theta)\right] \\ Q_3 = \frac{1}{N}\sum_{i=0}^{N-1}\left[B + A\left(\frac{3\pi}{2}-(\pi-\Delta)-\varphi-i\theta\right)\right] \end{cases} \qquad \text{[eq. 7]}$$

Solving equation 7 for the phase-shift θ yields the equation below:

$$\theta = \frac{\pi}{4\varepsilon}\frac{15Q_{01}-9Q_{02}-11Q_{13}+17Q_{23}}{Q_{01}+Q_{23}+Q_{02}+Q_{13}} - 4\pi\frac{Q_{01}-Q_{02}-Q_{13}+Q_{23}}{Q_{01}+Q_{23}+Q_{02}+Q_{13}} \qquad \text{[eq. 8]}$$

As discussed above, the phase-shift θ may be proportional to the motion, such as a depth motion, of a detected object. Equation 8 makes use of a notation related to a difference between accumulated charges, hereinafter referred to as a differential accumulated charge. In one example implementation, the differential accumulated charges may be expressed by the equation set below:

$$\begin{cases} Q_{01} \triangleq Q_0 - Q_1 = -A\left(2\varphi+(N-1+\varepsilon)\theta-\frac{\pi}{2}\right) \\ Q_{23} \triangleq Q_2 - Q_3 = +A\left(\varphi+\left(\frac{N-1}{2}+\varepsilon\right)\theta+2\pi\varepsilon-\frac{3\pi}{2}\right) \\ Q_{02} \triangleq Q_0 - Q_2 = -A\left(\varphi+\left(\frac{N-1}{2}+\varepsilon\right)\theta+2\pi\varepsilon-2\pi\right) \\ Q_{13} \triangleq Q_1 - Q_3 = +A\left(2\varphi+(N-1+\varepsilon)\theta\right) \end{cases} \qquad \text{[eq. 9]}$$

Note that in the differential accumulated charge equations above, the baseline component B has been canceled out, and therefore not required in determining the solution for the phase-shift θ. Similar to equation 5 above, the phase-shift θ in equation 8 may be determined with a single light pulse.

In some example implementations, changing the definitions of the differential accumulated charges may provide a different solution for the phase-shift θ. That is, a different solution for the phase-shift θ may be obtained using different differential accumulated charge values.

For example, the charge differences may be defined as expressed below:

$$\begin{cases} Q_{01} \triangleq Q_0 - Q_1 = -A\left(2\varphi+(N-1+\varepsilon)\theta-\frac{\pi}{2}\right) \\ Q_{12} \triangleq Q_1 - Q_2 = +A\left(\varphi+\frac{N-1}{2}\theta-2\pi\varepsilon+\frac{3\pi}{2}\right) \\ Q_{23} \triangleq Q_2 - Q_3 = +A\left(\varphi+\left(\frac{N-1}{2}+\varepsilon\right)\theta+2\pi\varepsilon-\frac{3\pi}{2}\right) \\ Q_{30} \triangleq Q_3 - Q_0 = -A\left(\frac{\pi}{2}\right) \end{cases} \qquad \text{[eq. 10]}$$

Returning to equation 7 and solving for the phase-shift θ using equation 10:

$$\theta = \frac{\pi}{2\varepsilon}\frac{(6-8\varepsilon)Q_{30}+Q_{12}-Q_{23}}{Q_{30}} \qquad \text{(eq. 11)}$$

Although the duty cycle of the waveforms shown in FIG. 4 is greater than 50%, in other implementations, the duty cycle may be less than 50% and the solutions outlined in equations 6 through 11 would still be applicable.

In other example implementations, the light pulses emitted by the light emitter may be pulsed periodically during a frame time. One such example implementation is discussed below in conjunction with FIG. 5.

Figure 5:
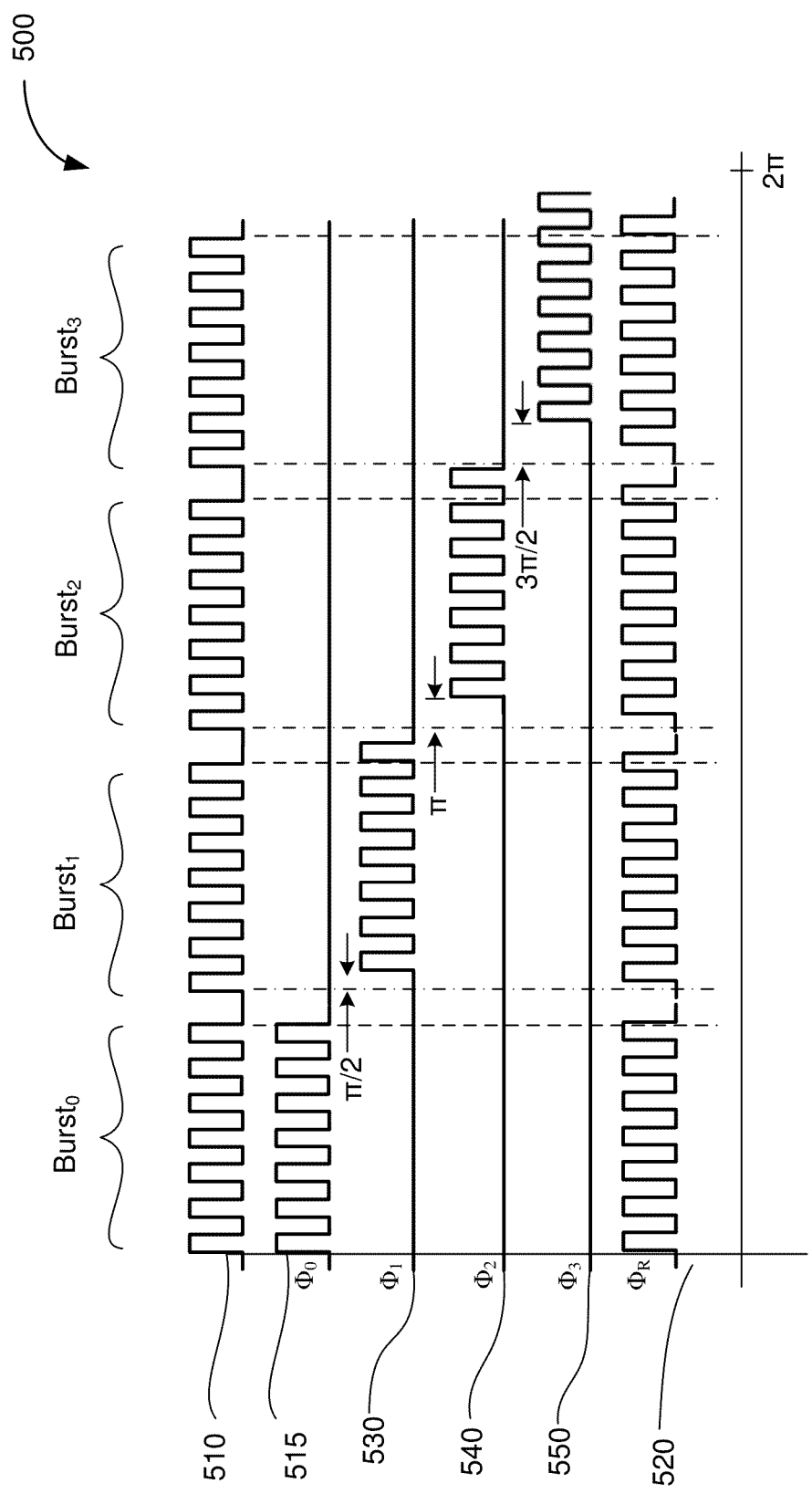
FIG. 5 shows another example diagram of signals and stored charges that may be associated with the time-of-flight camera of FIG. 1.

FIG. 5 shows another example timing diagram 500 of signals and charges that may be associated with the TOF camera 100 of FIG. 1. Waveform 510 may show example timing information associated with the emitter control signal 125 of FIG. 1. The example timing diagram 500 shows the waveform 510 as including four bursts ($Burst_0$ - $Burst_3$) for simplicity. In other implementations, the waveform 510 may include any feasible number of bursts.

Signal 520 may show example timing and amplitude information associated with the reflected light signal 135 based on the light bursts depicted in the waveform 510. As shown, the signal 520 is delayed with respect to the waveform 510. Although not shown, the signal 520 may include an amplitude A and a baseline component B. The delay may be associated with a TOF delay due to the distance between the TOF camera 100 and an object, and the velocity of light. If the object is in motion, the TOF delay may not be constant.

Charge may be accumulated based on the signal 520 (e.g., the reflected light signal 135) during time periods referenced to the waveform 510 (e.g., the emitter control signal 125). For example, waveform 515 may show timing and amplitude information associated with the light reflected from the first burst ($Burst_0$). In some implementations, there may be no discernible phase-shift between the waveform 510 and the waveform 515. A first charge $Q_0$ (not shown for simplicity) may be accumulated based on the waveform 515. Waveform 530 may have a π/2 phase-shift with respect to the waveform 510, and may show timing and amplitude information associated with light reflected from the second burst (Burst₁). A second charge $Q_1$ (not shown for simplicity) may be accumulated based on the waveform 530. Similarly, waveform 540, may have a π phase-shift with respect to the waveform 510, and may show timing and amplitude information associated with light reflected from the third burst (Burst₂). A third charge $Q_2$ (not shown for simplicity) may be accumulated based on the waveform 540. Waveform 550 may have a 3π/2 phase-shift with respect to the waveform 510, and may show timing and amplitude information associated with light reflected from the fourth burst (Burst₃). A fourth charge $Q_3$ (not shown for simplicity) may be accumulated based on the waveform 550. The accumulated charges may be expressed by the equations below:

$$\begin{cases} Q_0 = B + A(\pi - \varphi + 1.5\theta) \\ Q_1 = B + A\left(\frac{\pi}{2} + \varphi - 0.5\theta\right) \\ Q_2 = B + A(\varphi + 0.5\theta) \\ Q_3 = B + A\left(\frac{\pi}{2} - \varphi - 1.5\theta\right) \end{cases} \quad \text{(eq. 12)}$$

The phase-shift θ may be expressed by the equation below:

$$\theta = \frac{\pi}{2} \frac{-Q_{01}Q_{13} + 2Q_{01}Q_{23} - Q_{02}Q_{23}}{3Q_{01}Q_{13} - 4Q_{02}Q_{13} - 2Q_{01}Q_{23} + 3Q_{02}Q_{23}} \quad \text{(eq. 13)}$$

In another example implementation, if no baseline component B is present in the signal 520 (e.g., if the baseline component B is removed as described above with respect to FIG. 3), then the equation (12) may be written as:

$$\begin{cases} Q_0 = A(\pi - \varphi + 1.5\theta) \\ Q_1 = A\left(\frac{\pi}{2} + \varphi - 0.5\theta\right) \\ Q_2 = A(\varphi + 0.5\theta) \\ Q_3 = A\left(\frac{\pi}{2} - \varphi - 1.5\theta\right) \end{cases} \quad \text{(eq. 14)}$$

Equation 14 may be solved for the phase-shift θ to determine depth motion as expressed below:

$$\theta = \frac{\pi}{2} \frac{Q_0 - Q_1 + Q_2 - Q_3}{Q_0 + Q_1 + Q_2 + Q_3} \quad \text{(eq. 15)}$$

Figure 6:
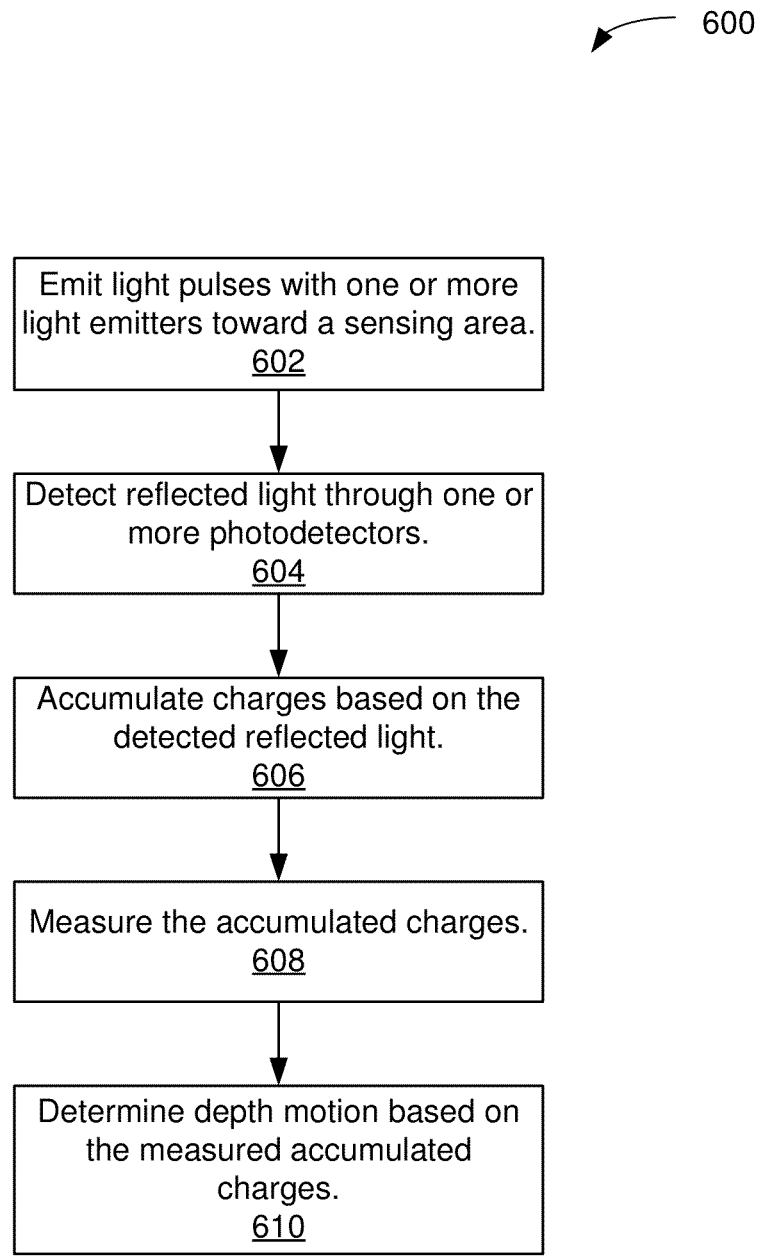
FIG. 6 is an illustrative flow chart depicting an example operation for determining a depth motion of an object, in accordance with some embodiments.

FIG. 6 is an illustrative flow chart depicting an example operation 600 for determining a depth motion of an object, in accordance with some embodiments. By way of example, the operation 600 may be performed by the controller 140 of FIG. 1. In other embodiments, the operation 600 may be performed by a processor (including a general-purpose processor), a state machine or any other technically feasible device. In some embodiments, the operation 600 may include fewer or more operational steps than those depicted in the example of FIG. 6. Further, two or more of the operational steps may be performed in a different order and/or in parallel.

The controller 140 first causes pulses of light to be emitted by one or more light emitters toward a sensing area (602). In some implementations, the controller 140 may control the light emitters through an emitter control signal. In some implementations, the controller 140 may cause the one or more light emitters to emit a burst of light pulses. Next, the controller 140 detects reflected light through one or more photodetectors (604). In some implementations, the controller may detect reflected light by receiving a reflected light signal from the one or more photodetectors.

Next, the controller 140 accumulates charges based on the detected reflected light (606). In some implementations, charge may be accumulated based, at least in part, on timing and amplitude information included in the reflected light signal. For example, as described above with respect to FIGS. 3-5, the charges may be accumulated based on a comparison of the reflected light signal and a version of the emitter control signal. In some embodiments, charges may be accumulated in a plurality of capacitors.

Next, the controller 140 measures the accumulated charges (608). In some implementations, the controller 140 may digitize and measure the accumulated charges. For example, the controller 140 may cause an ADC to determine the amount of charge stored in the capacitors during operational step 606.

Next, the controller 140 determines depth motion based on the measured accumulated charges (610). As described above with respect to FIGS. 3-5, the controller 140 can determine motion, including depth motion by determining a phase-shift based on the measured accumulated charges. In some implementations, differential accumulated charge may also be used to determine depth motion.

Figure 7:
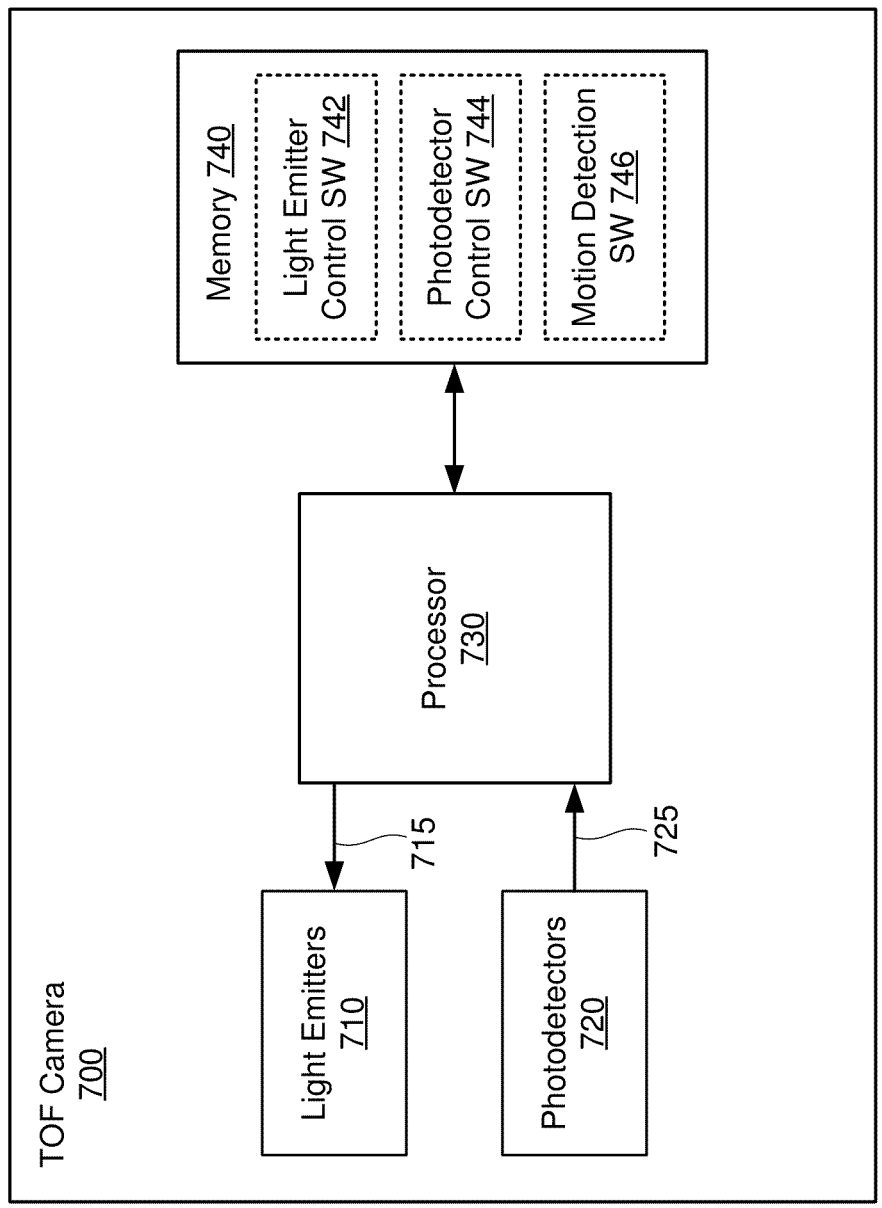
FIG. 7 shows a block diagram of an example time-of-flight camera.

FIG. 7 shows a block diagram of an example TOF camera 700. The TOF camera 700 may be one implementation of the TOF camera 100 of FIG. 1, and may include light emitters 710, photodetectors 720, a processor 730, and a memory 740. The light emitters 710 and the photodetectors 720 may be implementations of the light emitters 120 and the photodetectors 130 of FIG. 1.

The light emitters 710 may be coupled to the processor 730. The processor 730 may cause the light emitters 710 to emit a plurality of light pulses toward the sensing area. In one example implementation, the processor 730 may control the light emitters 710 with an emitter control signal 715. The photodetectors 720 may also be coupled to the processor 730. The photodetectors 720 may receive reflected light pulses from the sensing area and generate a related reflected light signal 725.

The memory 740 may include a non-transitory computer-readable medium (e.g., one or more nonvolatile memory elements, such as EPROM, EEPROM, Flash memory, a hard drive, etc.) that may store at least the following software (SW) modules:
- a light emitter control SW module 742 to control the operation (e.g., turning on and off) of the light emitters 610;
- a photodetector control SW module 744 to control the operation of the photodetectors 720; and
- a motion detection SW module 746 to determine depth motion of an object within the sensing area based on light transmitted by the light emitters 710 and detected by the photodetectors 720.

Each software module includes instructions that, when executed by the processor 730, cause the TOF camera 700 to perform the corresponding functions. The non-transitory computer-readable medium of memory 740 thus includes instructions for performing all or a portion of the operations described above with respect to FIGS. 3-6.

The processor 730 may execute the light emitter control SW module 742 to generate the emitter control signal 715 causing the light emitters 710 to emit a plurality of light pulses toward the sensing area. In some implementations, execution of the light emitter control SW module 742 may determine timing information associated with the emission of light pulses and also cause the light emitters 710 to emit bursts of light pulses.

The processor 730 may execute the photodetector control SW module 744 to determine timing information associated with the reflected light signal 725 provided by the photodetectors 720.

The processor 730 may execute the motion detection SW module 746 to determine depth motion information. In some implementations, execution of the motion detection SW module 746 may determine accumulated charge information associated with emitted and received light pulses. In addition, execution of the motion detection SW module 746 may determine corresponding phase and phase-shift information. The phase information may be associated with the distance of objects from the TOF camera 700. Similarly, the phase-shift information may be associated with (and in some cases proportional to) the depth motion of objects within the sensing area. Thus, the motion detection SW module 746 may perform one or more of the operations described in conjunction with FIGS. 3-6

Processor 730 may be any suitable one or more processors, controllers, state machines, FPGAs or the like, capable executing scripts or instructions of one or more software programs stored in the TOF camera 700 (e.g., within memory 740). For example, the processor 730 may execute the light emitter control SW module 742 to cause one or more pulses of light to be emitted toward a sensing area. The processor 730 may also execute the photodetector control SW module 744 to receive light reflected by an object within the sensing area. Further, the processor 730 may execute the motion detection SW module 746 to determine TOF information associated with the transmitted and reflected light and determine accumulated charge information. In some example implementations, the processor 730 may execute the motion detection SW module 746 to determine a phase and a phase-shift associated an object, and thereby determine a distance and a depth motion of the object.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An apparatus for determining a depth motion of an object, comprising:
   a light emitter configured to emit one or more light pulses;
   a photodetector configured to detect reflections of the one or more light pulses and generate a reflected light signal based on the detected reflections;
   a plurality of charge storage elements configured to accumulate charge based on the reflected light signal;
   a controller; and
   a memory storing instructions that, when executed by the controller, cause the apparatus to:
      measure a first plurality of accumulated charges associated with a first light pulse of the one or more light pulses; and
      determine a first phase-shift of the reflected light signal based on the first plurality of accumulated charges associated with the first light pulse and without measuring accumulated charges associated with any other light pulses emitted by the light emitter, wherein the first phase-shift indicates a motion of a first object toward or away from the photodetector, the first object reflecting the first light pulse.

2. The apparatus of claim 1, wherein the instructions to determine the first phase-shift cause the apparatus to further:
   determine charge differences between two or more of the charge storage elements, wherein the first phase-shift is determined based on the determined charge differences.

3. The apparatus of claim 1, wherein execution of the instructions causes the apparatus to further:
   measure a second plurality of accumulated charges accumulated with respect to the reflected light signal associated with a second light pulse; and
   determine a second phase-shift of the reflected light signal based on the second plurality of accumulated charges, wherein the second phase-shift indicates a motion of a second object toward or away from the photodetector, the second object reflecting the second light pulse.

4. The apparatus of claim 3, wherein the first and the second light pulses are successive in sequence.

5. The apparatus of claim 1, wherein the first plurality of accumulated charges are determined with respect to a plurality of time periods based at least in part on timing information associated with the first light pulse.

6. The apparatus of claim 5, wherein the first phase-shift is expressed by $$\theta = -\frac{\pi}{2} \frac{(\hat{Q}_0 - 3\hat{Q}_2) + (\hat{Q}_1 - 3\hat{Q}_3)}{(\hat{Q}_0 - \hat{Q}_2) + (\hat{Q}_1 + \hat{Q}_3)},$$

where θ is the first phase-shift, and $$\hat{Q}_0, \hat{Q}_1, \hat{Q}_2, \text{ and } \hat{Q}_3$$

are four accumulated charges, and π is related to a period associated with the first light pulse.

7. The apparatus of claim 1, wherein the first plurality of accumulated charges include charge due to background light, independent light sources, or a combination thereof.

8. The apparatus of claim 1, wherein the first light pulse has a non-symmetric form factor.

9. The apparatus of claim 8, wherein the first phase-shift is expressed by $$\theta = \frac{\pi}{4\varepsilon} \frac{15Q_{01} - 9Q_{02} - 11Q_{13} + 17Q_{23}}{Q_{01} + Q_{23} + Q_{02} + Q_{13}} - 4\pi \frac{Q_{01} - Q_{02} - Q_{13} + Q_{23}}{Q_{01} + Q_{23} + Q_{02} + Q_{13}},$$

where θ is the first phase-shift, $Q_{01}$ is a charge based on a difference between a first accumulated charge $Q_0$ and a second accumulated charge $Q_1$, $Q_{02}$ is a charge based on a difference between the first accumulated charge $Q_0$ and a third accumulated charge $Q_2$, $Q_{13}$ is a charge based on a difference between the second accumulated charge $Q_1$ and a fourth accumulated charge $Q_3$, $Q_{23}$ is a charge based on a difference between the third accumulated charge $Q_2$ and the fourth accumulated charge $Q_3$, ε is a constant based on the non-symmetric form factor, and π is related to a period of the first light pulse.

10. The apparatus of claim 8, wherein the first phase-shift is expressed by $$\theta = \frac{\pi}{2\varepsilon} \frac{(6 - 8\varepsilon)Q_{30} + Q_{12} - Q_{23}}{Q_{30}},$$

where θ is the first phase-shift, $Q_{30}$ is a charge based on a difference between a fourth accumulated charge $Q_3$ and a first accumulated charge $Q_0$, $Q_{12}$ is a charge based on difference between a second accumulated charge $Q_1$ and a third accumulated charge $Q_2$, $Q_{23}$ is a charge based on a difference between the third accumulated charge $Q_2$ and the fourth accumulated charge $Q_3$, ε is a constant based on the non-symmetric form factor, and π is related to a period of the first light pulse.

11. A method for determining a depth motion of an object from a reflected light signal, the method comprising:
  emitting, by a light emitter, one or more light pulses;
  detecting, by a photodetector, reflections of the one or more light pulses and generating a reflected light signal based on the detected reflections;
  accumulating charge, by a plurality of charge storage elements, based on the reflected light signal;
  measuring a first plurality of accumulated charges associated with a first light pulse of the one or more light pulses; and
  determining a first phase-shift of the reflected light signal based on the first plurality of accumulated charges associated with the first light pulse and without measuring accumulated charges associated with any other light pulses emitted by the light emitter, wherein the first phase-shift indicates a motion of a first object toward or away from the photodetector, the first object reflecting the first light pulse.

12. The method of claim 11, further comprising determining charge differences between two or more of the charge storage elements, wherein the first phase-shift is determined based on the determined charge differences.

13. The method of claim 11, further comprising:
  measuring a second plurality of accumulated charges accumulated with respect to the reflected light signal associated with a second light pulse reflected from the object; and
  determining a second phase-shift of the reflected light signal based on the second plurality of accumulated charges, wherein the second phase-shift indicates a motion of a second object toward or away from the photodetector, the second object reflecting the second light pulse.

14. The method of claim 13, wherein the first and the second light pulses are successive in sequence.

15. The method of claim 11, wherein the first plurality of accumulated charges are determined with respect to a plurality of time periods based at least in part on timing information associated with the first light pulse.

16. The method of claim 15, wherein the first phase-shift is expressed by $$\theta = -\frac{\pi}{2} \frac{(\hat{Q}_0 - 3\hat{Q}_2) + (\hat{Q}_1 - 3\hat{Q}_3)}{(\hat{Q}_0 - \hat{Q}_2) + (\hat{Q}_1 + \hat{Q}_3)},$$

where θ is the first phase-shift, and $$\hat{Q}_0, \hat{Q}_1, \hat{Q}_2, \text{ and } \hat{Q}_3$$

are four accumulated charges, and π is related to a period associated with the first light pulse.

17. The method of claim 11, wherein the first light pulse has a non-symmetric form factor and the first phase-shift is expressed by $$\theta = \frac{\pi}{4\varepsilon} \frac{15Q_{01} - 9Q_{02} - 11Q_{13} + 17Q_{23}}{Q_{01} + Q_{23} + Q_{02} + Q_{13}} - 4\pi \frac{Q_{01} - Q_{02} - Q_{13} + Q_{23}}{Q_{01} + Q_{23} + Q_{02} + Q_{13}},$$

where θ is the first phase-shift, $Q_{01}$ is a charge based on a difference between a first accumulated charge $Q_0$ and a second accumulated charge $Q_1$, $Q_{02}$ is a charge based on a difference between the first accumulated charge $Q_0$ and a third accumulated charge $Q_2$, $Q_{13}$ is a charge based on a difference between the second accumulated charge $Q_1$ and a fourth accumulated charge $Q_3$, $Q_{23}$ is a charge based on a difference between the third accumulated charge $Q_2$ and the fourth accumulated charge $Q_3$, ε is a constant based on the non-symmetric form factor, and π is related to a period of the first light pulse.

18. An apparatus comprising:
  means for emitting one or more light pulses;
  means for detecting reflections of the one or more light pulses;
  means for generating a reflected light signal based on the detected reflections;
  means for accumulating charge, by a plurality of charge storage elements, based on the reflected light signal;
  means for measuring a plurality of accumulated charges associated with a first light pulse of the one or more light pulses; and
  means for determining a phase-shift of the reflected light signal based on the plurality of accumulated charges associated with the first light pulse, and without measuring accumulated charges associated with any other light pulses emitted by the light emitter, wherein the phase-shift indicates a motion of an object toward or away from the means for detecting the reflections of the one or more light pulses.

* * * * *